United States Patent [19]

MacDonald

[11] 4,396,353
[45] Aug. 2, 1983

[54] SUBMERSIBLE SUMP PUMP

[75] Inventor: Robert D. MacDonald, Mesa, Ariz.

[73] Assignee: Flint & Walling, Inc., Livonia, Mich.

[21] Appl. No.: 253,424

[22] Filed: Apr. 13, 1981

[51] Int. Cl.³ .............................................. F04B 49/06
[52] U.S. Cl. ..................................................... 417/36
[58] Field of Search ...................... 417/36, 12; 340/619

[56] References Cited

U.S. PATENT DOCUMENTS

| | | | |
|---|---|---|---|
| 2,147,422 | 2/1939 | Bendz | 417/36 |
| 3,352,246 | 11/1967 | Inoue | 417/36 |
| 3,553,666 | 1/1971 | Melone | 340/619 |
| 4,156,149 | 5/1979 | Vaccari | 250/577 |
| 4,171,932 | 10/1979 | Miller | 417/36 |

OTHER PUBLICATIONS

Oppliger, Hans R. et al., "Electronic Measuring Cup for the Blind", Jul. 1977, IEEE Transactions on Biomedical Engineering, vol. BME-24, No. 4, pp. 386-388.

Primary Examiner—Carlton R. Croyle
Assistant Examiner—Timothy S. Thorpe
Attorney, Agent, or Firm—Cullen, Sloman, Cantor, Grauer, Scott & Rutherford

[57] ABSTRACT

A sump pump includes a submersible electric motor for driving an impeller which discharges water radially outward into a volute oriented in a horizontal plane at the bottom of the device. An optical sensor located at a predetermined pump-operating level utilizes the light reflecting and refracting properties of the sensor-chamber interface to sense the presence or absence of water at such level. In a first embodiment, the pump includes a supplementary water level-sensing chamber which has a first leg ascending from an inlet near its lower end to an overflow point at the top of a vertical barrier separating the first leg from a second leg which descends to the low pressure area of the impeller. The optical sensor is located at the overflow point such that the sensor will detect water and therefore activate the motor and the pump when the static water level is at least as high as the overflow point and will continue to detect water as the level subsequently drops because the pump will siphon water over the overflow point until the siphon is broken when the water level in the sump drops below the inlet of the first leg of the sensing chamber. When that occurs, the optical sensor will respond to the air drawn into the chamber by the pump and the control circuit will shut off the pump motor. In the preferred embodiment a single optical sensor is selectively positioned within the sump chamber to establish the pump-activating level. When the optical sensor senses water at this level, the pump motor is started, and once the water level falls below the pump-activating level, a signal for stopping the motor is generated. However, a delay circuit operates to delay the stopping of the motor for a predetermined time interval equal to the time required to pump a predetermined volume of water from the sump chamber. After this delay, the motor is stopped and will remain so until the liquid has again risen in the sump to the pump-activating level. In both embodiments, a single optical sensor functions to detect both the upper and lower levels which are predetermined to be the pump-starting and the pump-stopping control levels.

9 Claims, 9 Drawing Figures

SUBMERSIBLE SUMP PUMP

BACKGROUND OF THE INVENTION

One of the problems with conventional sump pumps is that the pump motor is subject to damage if it continues to operate after it is no longer submerged in the cooling water of the sump. Such damage may be caused by sticky floats or defective or corroded switches which fail to provide a signal to the motor indicating that the sump level has dropped to a predetermined point at which the motor and pump can and should be turned off.

If, instead of the float type of level-indicating mechanism, a pressure or optical sensor is provided, prior designs of which applicant is aware have required the use of two such sensors, one to indicate that the water level has risen to a predetermined level at which pump operation is to begin and a second sensor to indicate that the level has subsequently dropped to a level at which pump operation can and should be terminated. It will be appreciated by those skilled in the art that it is desirable that there be two such vertically spaced control levels to reduce the frequency of on-off cycling of the pump in response to the fluctuating water level. However, the use of two sensors necessarily increases the cost of the control portion of the sump pump and complicates maintainability.

Accordingly, it is the principal object of the present invention to provide an improved sump pump design which both (1) provides an assured signal that the water in the sump has risen to a predetermined pump-activating level for turning on the pump motor, and (2) an assured signal that the water level has dropped to a point at which the motor can and should be turned off, and which provides a simple, reliable and economical control system for determining both the upper and lower control levels.

SUMMARY OF THE INVENTION

The improved submersible sump pump of the present invention includes a modified motor control system and a single optical sensor which are used to effectively provide two distinct levels of control with the single sensor.

The optical sensor is of the known type wherein the fundamental principle of operation is based on an internal reflection from a 90 degree clear plastic cone or prism due to the presence or absence of a water base solution engaging the interface surface of the cone or prism. More specifically, when there is no water present at the sensor-chamber interface, light from a light-emitting diode is internally reflected to a phototransistor which provides a signal indicating that the pump motor should be off. However, when the sensor-chamber interface is submerged in water, the light from the light-emitting diode will be refracted and scattered into the water rather than internally reflected to the phototransistor, and the phototransistor will output a signal indicating that the pump motor should be activated.

In the preferred embodiment of the present invention, the optical sensor is selectively positioned to establish a predetermined first or pump-activating level within the sump. Whenever the water in the sump rises to the predetermined first level, the light from the light-emitting diode will be refracted causing the phototransistor to be nonconductive. This causes the motor control circuit to activate the motor to begin pumping liquid from the sump chamber. As soon as the liquid has fallen to below the predetermined first level, the light from the light-emitting diode will be reflected back to the phototransistor causing it to generate a motor stop signal. However, delay circuitry causes the motor stop signal to be delayed for a predetermined time interval which is equal to the time required for the pump to remove a predetermined volume of water from the sump chamber. After the predetermined time interval has lapsed and the pump has removed the predetermined volume of water from the chamber, and hence the water has receded to a second substantially lower level, the pump motor is again turned off and will remain so until the liquid again rises to the first predetermined level.

In an alternate embodiment of the present invention a novel design of a supplemental level-sensing chamber causes the optical sensor to be submerged when the static level has risen to the upper predetermined level for commencing pump operation and also thereafter until the descending water level has dropped to the second predetermined level at which pump operation is to be terminated. The latter phenomena results from the placement of the sensor in a siphon path in which the operating pump continues to siphon water from over a barrier located at the level of the sensor until the inlet of the sensing chamber, which is located at the predetermined second, substantially lower level, is exposed to air to thereby break the siphon and terminate the flow of sensor-submerging water.

Thus, the sensing system of this embodiment utilizes the presence of liquid at a single point, where the optical sensor is located, to indicate two conditions: (1) the static liquid level at an upper pump-activating level, and (2) dynamic fluid flow past such point until the static level has subsided to a second, substantially lower pump-deactivating level.

DETAILED DESCRIPTION OF THE INVENTION

Figure 1:
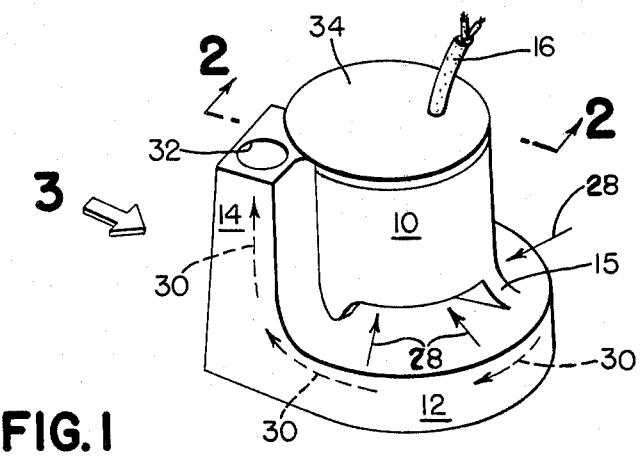
FIG. 1 is a simplified perspective view of one embodiment of the sump pump of the present invention.
Figure 3:
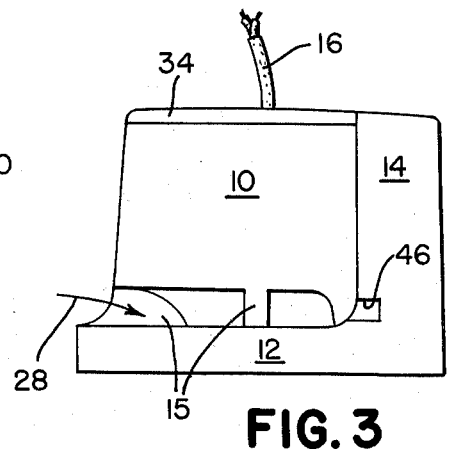
FIG. 3 is a side view in the direction of arrow 3 of FIG. 1.
Figure 2:
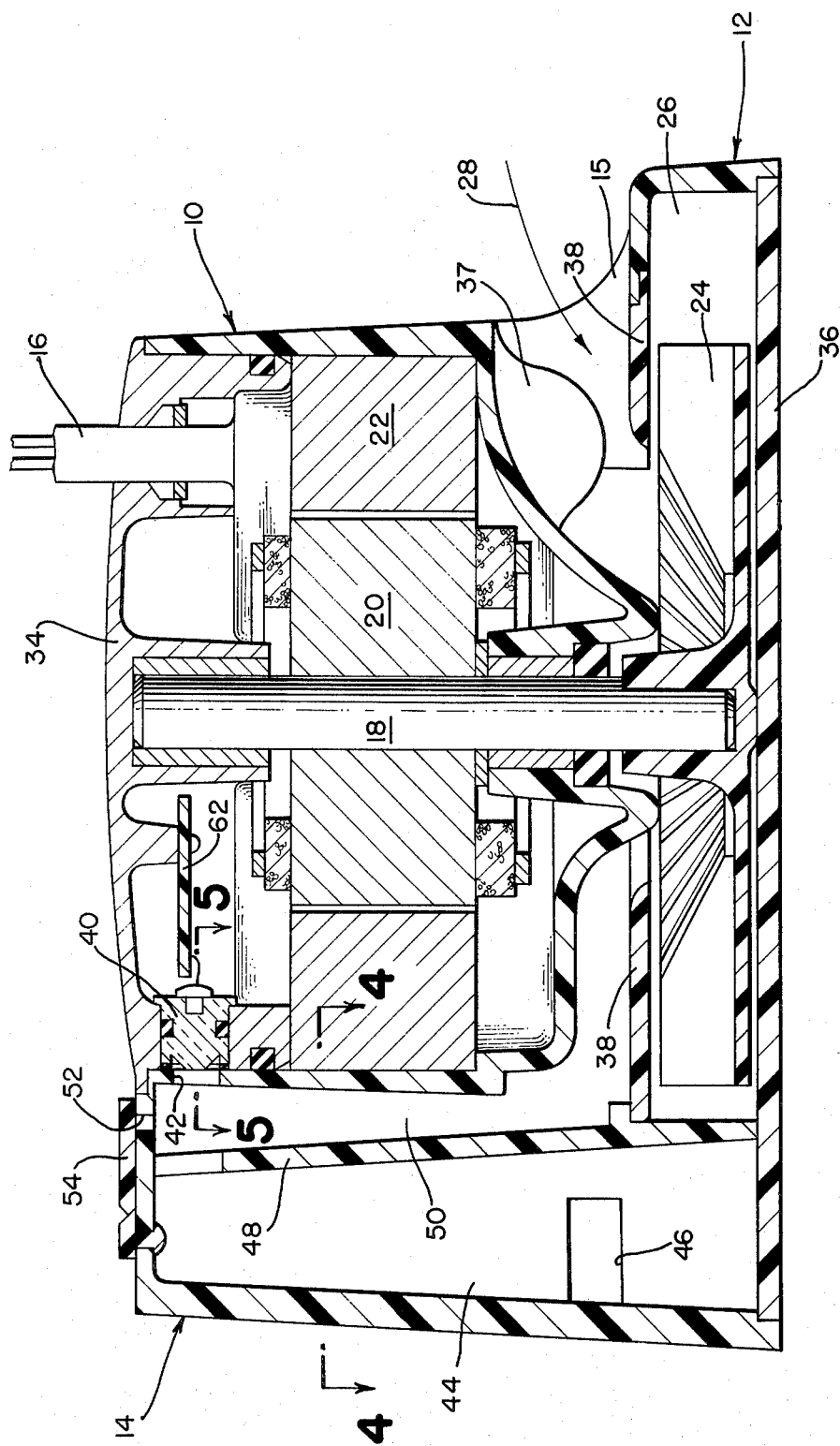
FIG. 2 is an enlarged cross-sectional side view in the direction of arrows 2—2 of FIG. 1.

Referring to FIGS. 1-3 of the drawings, the sump pump of the present invention is contained within a housing which generally comprises a motor housing portion 10, a spiral scroll or volute housing portion 12 and a sensing chamber and pump outlet portion 14. A plurality of circumferentially spaced and radially extending ribs 15 interconnect motor housing 10 with volute housing 12, and the angular space between such ribs define inlet openings for water in the sump to enter volute chamber 12.

A power supply cable 16 provides a source of electrical energy for the motor, which may, for example, be a one-third horsepower 1800 rpm motor having a vertical shaft 18, rotor windings 20 and stator windings 22. The cable is secured to the housing by appropriate washers, grommets and nuts. Shaft 18 is rotatably mounted within housing 10 by appropriate bearings, and has mounted on its lower end a pump impeller 24 which rotates within the sprial scroll or volute 26.

Figure 4:
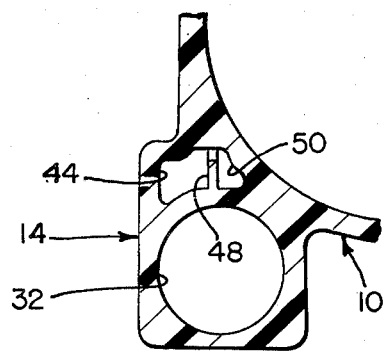
FIG. 4 is the fragmented cross-sectional view in the direction of arrows 4—4 of FIG. 2.

Upon rotation of impeller 24, water is drawn into the low pressure area near the center of the impeller along an inlet flow path (indicated by arrows 28) between motor and volute housing portions 10 and 12, which path extends around the unit except on the side where portion 14 of the housing is located. The water is propelled radially outwardly by the rotating impeller 24 while flowing circumferentially around the volute along a path indicated by arrows 30 in FIG. 1 and then vertically upward through the outlet channel 32, as shown in FIGS. 1 and 4. Outlet channel 32 does not show in FIG. 2, because the plane of the section shown in FIG. 2 is located rearwardly of outlet stack 32, as can be seen from FIG. 1. An appropriate outlet pipe would be connected to outlet channel 32 to convey pumped water to the desired location.

Housing portions 10 and 12, which may be fabricated of glass reinforced polycarbonate, are closed at the top by cover 34, which may be die cast aluminum to act as a heat sink, and at the bottom by a bottom plate 36. Cover 34 may be secured to the housing by horizontally extending screws or it may simply be pressed into the housing, with the compression of the surrounding O-ring retaining it in place. In the latter alternative, a water-tight vacuum relief hole may be provided, normally sealed by a screw, to permit the cover to be removed for service. The bottom plate 36 may be cemented in place.

As shown in FIG. 2, the lower portions of the motor housing 10 may be provided with a series of circumferentially spaced wells or downward protrusions which receive the lower portions of stator windings 22, and provide increased surface area exposed to the cooling water entering along path 28. Motor and volute housing portions 10 and 12 of the sump pump unit are preferably injection molded as a single integral piece about a generally horizontally disposed parting line through the bottom of motor housing portion 10. To permit the lower portion of motor housing 10 to be molded from below, it is necessary to utilize an insert ring 38 which is subsequently cemented in place to close off the upper portion of volute housing 12, as shown in FIG. 2.

Figure 5:
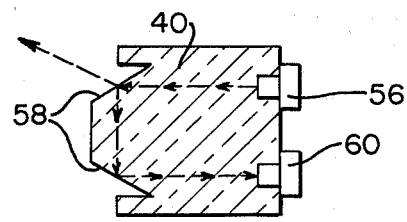
FIG. 5 is an enlarged cross-sectional top view of the optical sensing device of the present invention.

The single optical sensor 40, shown in FIGS. 2 and 5 is secured in place next to an access port 42 in the upper portion of a supplementary water inlet path in vertical stack portion 14 of the housing. This supplementary inlet path also serves as a water level sensing chamber and comprises an ascending leg 44 which rises from inlet port 46 (see FIGS. 2-4) to an overflow point at the top of vertical partition 48, from which the overflowing water in the sensing chamber travels downwardly along a descending leg 50 to the low pressure zone near the center of impeller 24. A vent port 52 is located in the top of stack 14 is controlled by a flexible one-way flap valve 54, and serves to prevent formation of an air lock as water rises in the sensing chamber. The relative positions of outlet channel 32 and the ascending and descending legs 44, 50 of the sensing chamber are best seen in the cross-sectional view of FIG. 4.

Optical sensing device 40 is of a known type which makes use of the variable reflection-refraction properties of an interface between materials of different density. As best shown in FIG. 5, light from a light-emitting diode 56 travels through a clear acrylic rod portion of the sensor until it strikes the angled interface surface 58 which is exposed to the upper portion of the sensing chamber at the top of descending leg 50. The surface 58 may be, for example, one face of an internally reflecting prism or a truncated cone. When surface 58 is above the water level, the highly reflective lens-air interface which then exists at such surface reflects the light from diode 56 internally back to phototransistor 60. However, when interface 58 is submerged in water, such surface loses its high reflectivity, and light is refracted as it is transmitted and scattered out into the water across the rod-water interface, with very little light being reflected internally to phototransistor 60. Fluid level detecting devices of this type have been described in the prior art, including U.S. Pat. Nos. 2,350,712, 3,544,799, 3,882,887 and 4,156,149.

The details of the motor control circuit used for liquid level control and associated with the optical sensing device 40 are mounted on circuit board 62 and will now be described with reference to FIG. 6.

Figure 6:
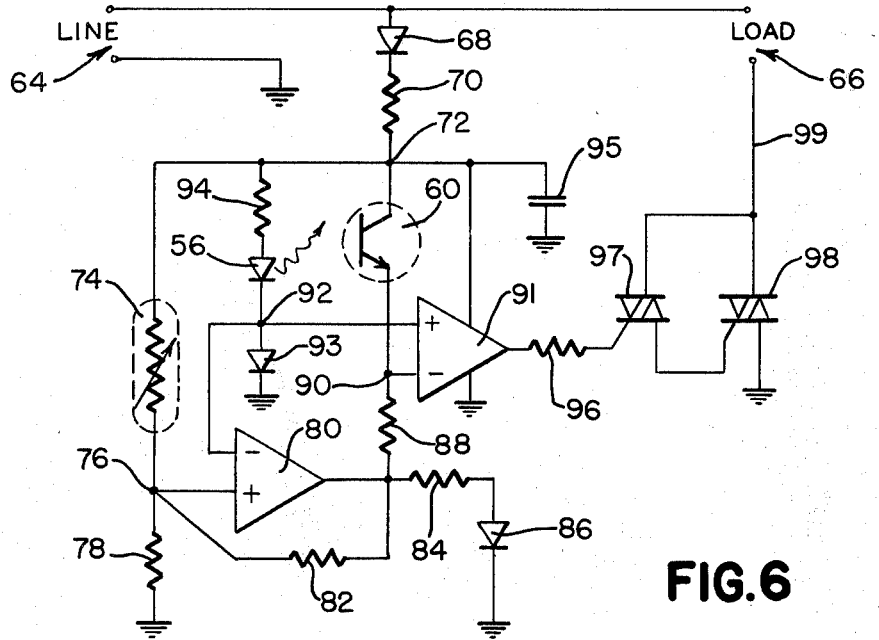
FIG. 6 is a schematic diagram of the electrical control circuit used with the sump pump of FIGS. 1 and 2.

FIG. 6 shows an electrical schematic diagram of the motor control circuit used for liquid level control. This circuit is designed to operate from an AC source such as a nominal 115 volt 60 Hz supply coupled to the line input 64 and supply or drive an induction motor load of approximately one-third horsepower represented by the load outputs 66. One of the line inputs 64 is connected directly to ground and the other input is connected directly to the load output 66 and to the anode of the diode 68 whose cathode is coupled through a resistor 70 to a node 72.

Node 72 is connected to one terminal of a conventional thermistor 74 whose opposite terminal is connected to a non-inverting input node 76. Input node 76 is connected to ground through a resistor 78 and is directly connected to the non-inverting input of an operational amplifier 80 which is configured as a hysteresis amplifier. The operational amplifier 80 is a conventional, commercially available device, such as one-half of a dual LM358 operational amplifier such as that manufactured by the National Semiconductor Corporation of Santa Clara, Calif. The output of the operational amplifier 80 is connected back to the non-inverting input node 76 through a feedback resistor 82. The output of the amplifier 80 is also connected through a resistor 84 to the anode of a light-emitting diode (LED) 86 whose cathode is connected directly to ground. In the preferred embodiment of the present invention, the LED 86 emits a red light when it is operated and the red light serves to indicate that the output power has been turned off due to an excessive temperature condition.

The output of the operational amplifier 80 is also connected through a resistor 88 to an inverting input node 90. The inverting input node 90 is connected directly to the inverting input of a second operational amplifier 91. The operational amplifier 91 may, for example, be the other half of the dual LM358 integrated circuit previously discussed with reference to operational amplifier 80. The non-inverting input of the operational amplifier 91 is connected directly to a non-inverting input node 92. Node 92 is connected directly to the inverting input of the operational amplifier 80 and, simultaneously, to the anode of a light-emitting diode (LED) 93 whose cathode is connected to ground. The LED 93 is, in the preferred embodiment of the present invention, green so that it emits a green light to provide a visible green indication showing that power is present. The non-inverting input node 92 is also connected to the cathode of an infrared light-emitting diode (LED) 56 which is used for a sensor light source, as previously described. The anode of the infrared LED 56 is connected through a resistor 94 to node 72.

Node 72 is also connected to the positive supply input of the operational amplifier 91 and to one plate of the capacitor 95 whose opposite plate is connected to ground. Node 72 is further connected to the collector of a photo-transistor 60 whose emitter is connected directly to the inverting input node 90, previously described. The phototransistor 60 acts in conjunction with the infrared light-emitting diode 56 for control purposes as hereinafter described.

The output of the operational amplifier 91 is connected through a resistor 96 to the gate electrode of the first triac 97 whose first electrode is connected to the gate electrode of a second triac 98. The first electrode of the second triac 98 is connected directly to ground and the second electrode of triacs 97 and 98 are commonly connected together and supplied via lead 99 to the load outputs 66 so as to provide a path to ground when the triacs 97, 98 are conducting to enable the motor at the load output 66 to operate from the line input supply.

The operation of the circuit of FIG. 6 will now be briefly described. In the normally off state, the light supplied by the infrared light-emitting diode 56 is reflected by the uncovered interface surfaces 58 of FIG. 5 and received at the base of the photo-transistor 60 causing it to be maintained in the conductive state. With the photo-transistor 60 normally conducting, the signal present at the inverting input node 90 is higher than the reference input present at node 92 which causes the output of the operational amplifier 91 to be maintained low. With the output of the operational amplifier 91 normally low, triacs 97 and 98 will be held in a non-conductive state so that there is no return path to ground for the load and therefore the pump motor will not operate.

The presence of water around the interface surfaces 58 will cause the light emitted from the infrared LED 56 to be radiated into the water instead of being reflected from the interface surfaces 58 so that little or no light is received at the base of the photo-transistor 60. With no light at the base of the photo-transistor 60, it is switched to a non-conductive state. When the phototransistor 60 turns off, the signal present at the inverting input 90 is lower than the signal present at the non-inverting input node 92 causing the output of the amplifier 91 to go high. With a high at the output of amplifier 91, triac 97 is switched to a conductive state and this immediately switches triac 98 to a conductive state so as to form a conductive path between the load 66 and ground via lead 99 and conducting triac 98. With the load energized, the pump motor will operate as conventionally known.

When a sufficient amount of water has been pumped out so that the interface surfaces once again reflect the light emitted from the infrared LED 56 back to the base of the photo-transistor 60 to switch it back to its normally conductive state, node 90 will again go low turning off the amplifier 91 and the triacs 97, 98 to de-energize the load. When the inverting input node 90 is switched to the high state, additional current is drawn which reduces the supply voltage to the LEDs 56, 93, thereby providing an effective hysteresis around the control point.

The other operational amplifier 80 is used as a hysteresis amplifier for temperature control purposes. The temperature is sensed by the thermistor 74 and at normal temperature, the resistance of the thermistor 74 is extremely high causing the value of the signal present at the non-inverting input node 76 to be low compared to the value of the signal presented to the inverting input from reference node 92. This maintains the output of the operational amplifier 80 low during normal operation thereby allowing the operational amplifier 91 to function as described above while maintaining the red LED 86 in the off or non-conducting state.

If, however, the temperature sensed by the thermistor 74 increases, the resistance of the thermistor 74 goes down until the signal at node 76 becomes more positive than the signal present at node 92. At this point, the output of the amplifier 80 will go high to force the signal at the inverting input node 90 of operational amplifier 91 to be maintained high thereby keeping the output of the amplifier 91 low to turn off the triacs 97, 98 and maintain the load in the de-energized state. Simultaneously, the high at the output of operational amplifier 80 will turn on the red LED 86 to provide a visible indication that the motor has been turned off in response to the detection of an excessive temperature condition.

The combination of diode 68, resistor 70 and capacitor 95 provide a low voltage DC supply for the electronic circuit of FIG. 6 from the 115 volt AC line supply at the input 64, as conventionally known. This circuit provides excellent control over the pump motor operation in response to the light detected or not detected at the base of the photo-transistor 60, as previously described.

OPERATION OF THE PUMP OF FIGS. 1-4

The sump pump of FIGS. 1-4 is designed to work with predetermined upper and lower liquid control levels. That is, when the water in the sump in which the device is submerged reaches the overflow point at the top of partition 48 in the sensing chamber, the device is designed to turn the pump on to start pumping water out of the sump. It is designed to continue pumping until the water level in the sump falls below the upper edge of inlet 46 to the sensing chamber.

For purposes of explanation, let it be assumed that the pump has just shut off after lowering the water level below the upper edge of sensing chamber inlet port 46. Water will, at that level, completely fill volute 26, and as the level subsequently rises, it will rise simultaneously in both the ascending and descending legs 44, 50 of the sensing chamber. That is, water will enter ascending leg 44 from inlet port 46, and will enter descending leg 50 from volute 26. As the water level rises, the air in such chamber above the water level will be forced outwardly through vent port 52, as permitted by one-way flap valve 54.

During this period, light from light-emitting diode 56 is reflected internally within optical sensor 40 to phototransistor 60, causing the control circuit to maintain an interruption in the power supply to the motor.

When the water level in the sensing chamber rises to the point that it submerges interface surface 58 of optical sensor 40, such light will be transmitted through interface surface 58 into the water, and the phototransistor 60 will no longer receive an adequate light signal. The resulting operation of the control circuit then causes the pump motor to turn on, with the resulting subsidence of water level in the sump. Water is simultaneously drawn into volute 26 both along path 28 and through the sensing chamber.

However, the operation of the pump will, by the well-known siphon phenomenon, continue to draw water in through inlet port 46, up ascending leg 44, over partition 48 and down descending leg 50 to impeller 24, thus maintaining interface surface 58 of optical sensor 40 submerged in water. That is, notwithstanding the fact that the static water level in the surrounding sump may no longer be above the top of partition 48, the unique design of the sump pump of this invention causes the single optical sensor 40 to continue to "see" water at the level of the sensor, thus maintaining the pump in operation. The pump will continue operating until the water level in the sump falls below the upper edge of inlet port 46, whereupon the siphon will be broken by exposure to air. The pump will continue to operate for a short while due to the presence of a residue of water on interface surface 58, but such residue will be quickly evaporated as a result of the high speed flow of air drawn through the sensing chamber by the pump. As soon as interface surface 58 is substantially dry, light will once again be internally reflected from diode 56 to phototransistor 60, shutting off the pump.

Thus, there are no mechanical or electrical components in the level-sensing system to jamb, bend, corrode or be tampered with, and a single sensing device reliably indicates the pump-activating upper liquid level and the pump-deactivating lower liquid level. There is no danger of extended operation of the motor after loss of cooling water, as long as the level of inlet port 46 is not significantly lower than motor winding wells 37.

An alternative form of the invention (not illustrated) can be utilized to provide a greater vertical distance between the two control levels than can be accommodated within the compact unit disclosed and illustrated herein. The effective height of the sensing chamber can be significantly extended by the use of an inverted U-shaped tube, a first leg of which is open at the bottom and connects to inlet port 46 and the second leg of which is open at the bottom to communicate with the lower pressure zone of the volute. Such tube thereby replaces legs 44, 50 of the sensing chamber, and can extend above the main body of the sump pump unit. The elevation of optical sensor 40 in the second leg need not change, and would be irrelevant, because no submerging water from the first leg of the inverted tube would reach it until the static level overflowed from the first to the second leg of such tube, which point would be the desired pump-activating level. A one-way valve in the bottom of the second leg of the tube would prevent water from the volute from rising in the second leg to prematurely submerge the sensor, while permitting normal flow toward the volute from the sensing chamber.

THE EMBODIMENT OF FIGS. 7-9

The preferred embodiment of the present invention will now be described with reference to FIGS. 7-9. The submersible sump pump of the preferred embodiment of the present invention is contained within a housing which generally comprises a motor housing portion 11 and a spiral scroll or volute housing portion 13. A support 39 interconnects the motor housing 11 with the volute housing 13 and an annular opening in the support 39 defines inlet openings or paths 31 for the water in the sump pit to enter the volute chamber 13.

Figure 8:
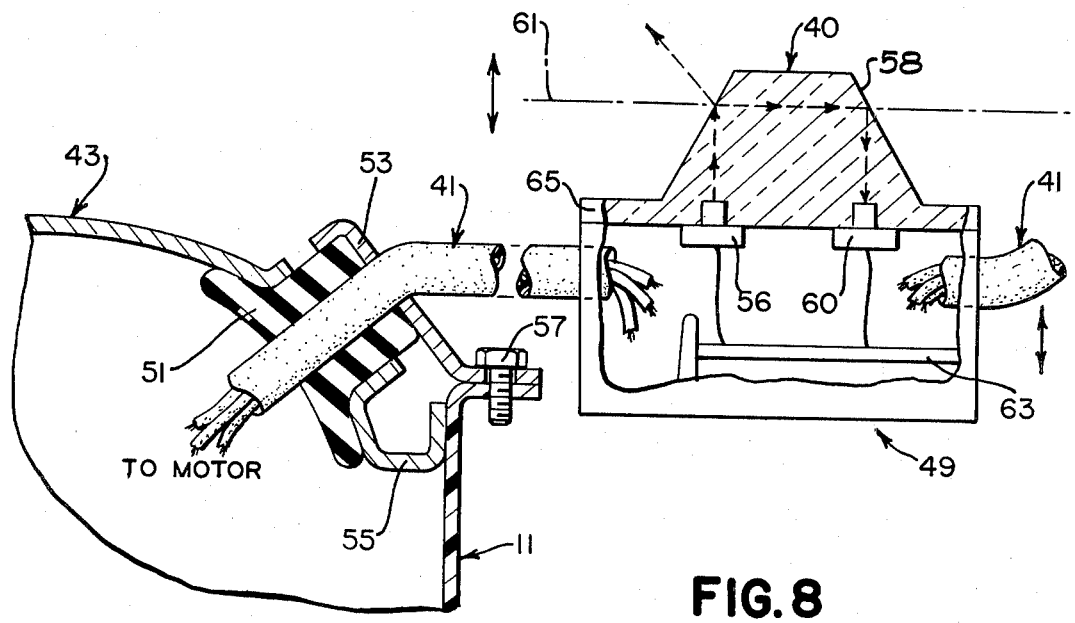
FIG. 8 is a cross-sectional view of the motor control chamber of the sump pump of FIG. 7.

A power supply cable 41, shown in FIG. 8, provides a source of electrical energy for operating the motor 19, which may, for example, be a one-third horsepower 1800 rpm motor having a vertical shaft 21, rotor windings 23, and stator windings 25. The cable is secured to the motor housing 11 by appropriate grommets etc. as hereinafter described with reference to FIG. 8. The motor shaft 21 is rotatably mounted within the motor housing 11 by appropriate bearings, and has mounted on its lower end a pump impeller 27 which rotates within the spiral scroll or volute 29.

Upon rotation of impeller 27, water is drawn into the lower pressure area near the center of the impeller along an inlet flow path (shown by the arrows 31) through the support 39 between the motor housing 11 and the volute housing 13, which path extends around the unit except on the side where the outlet stack 17 is located. The water is propelled radially outward by the rotating impeller 27 while flowing circumferentially around the volute along a path indicated by the arrows 30 in FIG. 1 and then vertically upward through the outlet channel or stack 17 as indicated by the arrow 33. The outlet stack 17 may be, for example, connected to a conventional riser pipe or outlet 35 to convey pumped water to the desired location.

Housing portions 11 and 13, which may be fabricated of drawn steel or the like, are closed at the top by a cover 43 which may be, for example, a steel lid with a sealant which is press fit within the top portion of the motor housing 11, as known in the art. Furthermore, a bail 45 may be pivotally connected to the motor housing 11 to act as the carrying handle or the like.

FIG. 8 illustrates the variably positionable control housing 49 of the preferred embodiment of the present invention. In FIG. 8, the power supply cable 41 is supplied from an external source, not shown, to the control housing 49 and then the power cable 41 is connected to supply power to the motor 19 within the motor housing 11 of FIG. 7. The power supply cable 41 passes through an aperture in the cover 43 and a grommet 51 and bracket 55 provide a water-proof seal about the cable 41. A clamp 53 is secured to the housing 11 by a screw 57 or the like so that the power supply cable 41 is connected to the motor 19 while the grommet 51 seals out all water from the motor housing 11.

The external control housing 49 may be vertically positionable within the sump pit to establish a predetermined pump-activating level as indicated by the dotted line 61. The control housing 49 may, for example, be secured to the riser pipe 35 of FIG. 7 by a clamp or the like (not shown, but known in the art), so as to establish the level 61 at any desired height within the sump pit.

The control housing 49 is used to house the control circuitry hereinafter described. The optical sensor 40 is shown as protruding from the top surface 65 of the control housing 49 and it functions as described with reference to FIG. 5. A light-emitting source 56 supplies a beam of light as represented by the dotted arrows in FIG. 8. The light impinges upon the surface 58 which may be, for example, one side of a prism or a truncated cone of translucent plastic material. If the interface at the point of impingement with the surface 58 is submerged, the light will be refracted and diffused into the water but if the interface is exposed to air, the light will be internally reflected as indicated by the dotted arrows back to the light-detecting sensor 58. The light-emitting device 56 and sensor 58 are electrically connected to a circuit board 63 which contains additional control circuitry as hereinafter described with reference to FIG. 9.

The control circuitry of FIG. 9 will now be described. The light-emitting sensor 56 of FIG. 8 may be, for example, an infrared light-emitting diode 71 and the light-detector 58 may be an infrared-sensitive phototransistor 73. The anode of the LEG 71 is connected through a resistor 94 to the collector of the phototransistor 73 while the cathode of LED 71 is connected to a node 75. Node 75 is connected to the anode of a visible light-emitting diode 77 whose cathode is connected to ground and, simultaneously, node 75 is connected to the non-inverting input of an operational amplifier 79. The collector of phototransistor 73 is connected to a node 81. Node 81 is connected to the cathode of a zener diode 83 whose anode is connected to ground; is connected through a resistor 85 to ground; and is connected to the cathode of a diode 87 whose anode is connected to the inverting input of the amplifier 79.

An RC delay network including a resistor 101 and a capacitor 103 is connected as follows. One end of the resistor 101 is connected to the collector of phototransistor 73 and the opposite end of resistor 101 is connected to the inverting input of the amplifier 79. The inverting input of the amplifier 79 is then connected through the capacitor 103 to ground. The values of the resistor 101 and the capacitor 103, in the preferred embodiment of the present invention, are selected such that the RC time constant and hence the delay time interval is equal to the time required to pump a predetermined volume of water from the sump pit. This can, as known in the art, be calculated relatively easily. For example, if the dimensions of the sump pit are known so that the volume of water in the sump to a predetermined pump-activating level (less the volume of the pump) and the flow rate at which the pump can output the water from the sump pit are known, it is easy to establish the time interval required for the pump to operate to empty the sump pit or to otherwise remove some predetermined volume of water from the pit. As a safety factor, for instance, the time delay may be chosen so as to allow sufficient time to pump out the pit while insuring there is no risk of overheating the pump motor or, alternatively, the volume could be chosen so as to ensure that some amount of water always remains in the pit to cool the motor.

A power supply is connected from the line input via lead 105 to the load, which in the present case is the motor 19 contained within the submersible sump pump of the present invention. The power supply lead 105 is connected to the anode of a diode 107 whose cathode is connected through a resistor 109 to (1) the power supply input of the amplifier 79; (2) the collector of the phototransistor 73; and (3) ground through a capacitor 111.

The output of the amplifier 79 is connected through a resistor 113 to the gate electrode of a first triac 115 whose first electrode is connected to the gate electrode of a second triac 117. The first electrode of the second triac 117 is connected directly to ground. The second electrode of the first triac 115 is connected through a resistor 119 to a node 121. Node 121 is connected through a resistor 123 to the second electrode of the second triac 117. Note 121 is also connected to ground through a capacitor 125 while the second electrode of triac 117 provides the ground path for the load via lead 127. All of the electrical components employed in the circuit of FIG. 9 are conventional as were those described in FIG. 6.

Figure 9:
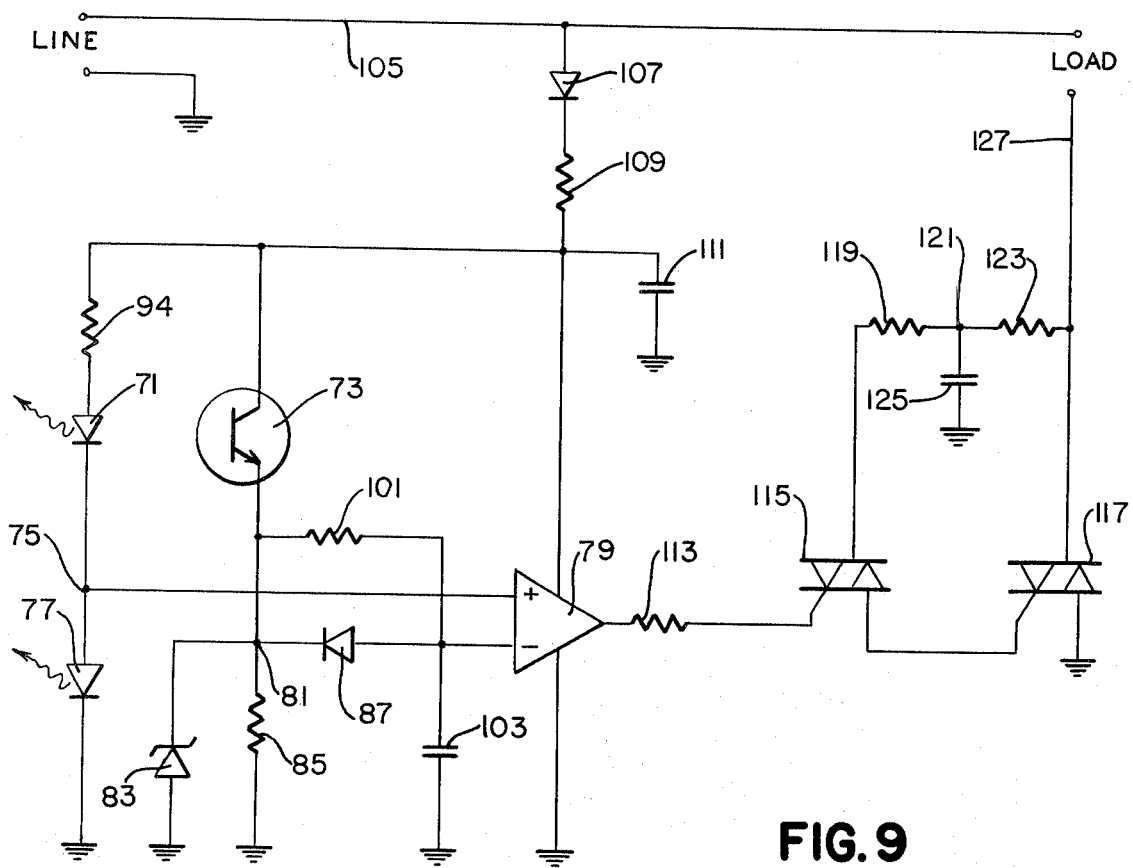
FIG. 9 is a schematic diagram of the electrical control circuitry of the sump pump of FIGS. 7 and 8.

The operation of the circuit of FIG. 9 will now be briefly described. When no water is present at the interface 58 of FIG. 8, the infrared light from the LED 71 is internally reflected by the uncovered interface surfaces 58 and received at the base of the phototransistor 73 causing it to be maintained in its conductive state. With the phototransistor 73 maintained in a normally conducting state, the signal present at node 81 will be high. With a high present at node 81, diode 87 will block current to the inverting input of the amplifier 79. However, with this normally high condition at node 81 a high will be supplied to the inverting input of the amplifier 79 via the RC network comprising resistor 101 and capacitor 103. With the high signal present at the inverting input of the amplifier 79, its output will be low, and a low at the output of the amplifier 79 will cause the triacs 115 and 117 to remain nonconductive so that there is no ground path from the load thereby maintaining the motor 19 in the deactivated or "off" state.

Whenever the liquid in the sump pit rises to the first predetermined pump-activating level 61 established by the positioning of the control housing 49 within the sump pit, the light from the LED 71 will be refracted and diffused into the liquid at the interface 58. This being so, relatively little light is internally reflected by the surfaces 58 so that the phototransistor 73 switches from its normally conductive state to a nonconductive state indicating the presence of water at the pump-activating level. As soon as transistor 73 is rendered nonconductive, the inverting input of the amplifier 79 is pulled low relative to the signal at the non-inverting input. This causes the output of amplifier 79 to go high, and the presence of a high at the output of the amplifier 79 will switch the first triac 115 to a conductive state and this will switch the second triac 117 to a conductive state so as to complete a ground path for the motor 19 via lead 127 thereby activating the motor 19 to begin pumping liquid from the sump pit. The non-inverting input of the amplifier 79 is referenced to approximately plus two volts due to the forward voltage drop of the LED 77 which is used as a visible light-emitting diode to indicate the presence of power to the system.

The circuit will continue to operate as described above so long as liquid is present at the interface surface 58. However, as soon as the level of water falls below the pump-activating level 61, the light emitted by the LED 71 will be internally reflected by the surfaces 58 and the phototransistor 73 will again be switched to a conductive state indicating a motor stop control signal. With phototransistor 73 conducting, node 81 will again go high. This high cannot be applied to the inverting input of the amplifier 79 directly due to the blocking diode 87, but the high will be applied via the RC delay network comprising resistor 101 and capacitor 103. As mentioned previously, the values of the resistor 101 and the capacitor 103 may be selected so that the time constant of the RC circuit allows a time delay equal to the time interval required for the pump to remove a predetermined quantity or volume of water from the sump pit.

During this time delay, the motor continues to operate and the pump continues to remove water from the sump. At the end of the delay period, a charge will have built on the capacitor 103 so that the delayed motor stop control signal present at the inverting input is high. With a high at the inverting input of the amplifier 79, its output is switched low and a low at the output of the amplifier 79 will turn off the triacs 115 and 117 to break the ground path and turn off the motor 19.

Therefore, it can be seen that in a sump pump application this technique provides for the equivalent of "two-level" sensing with a single sensor since the water rising about the optical sensor 40 will start the pump and as the accumulated water is pumped away the time delay as established by resistor 101 and capaitor 103 will carry the water level significantly below the sensor point to a second level selected by the duration of the time delay.

Figure 7:
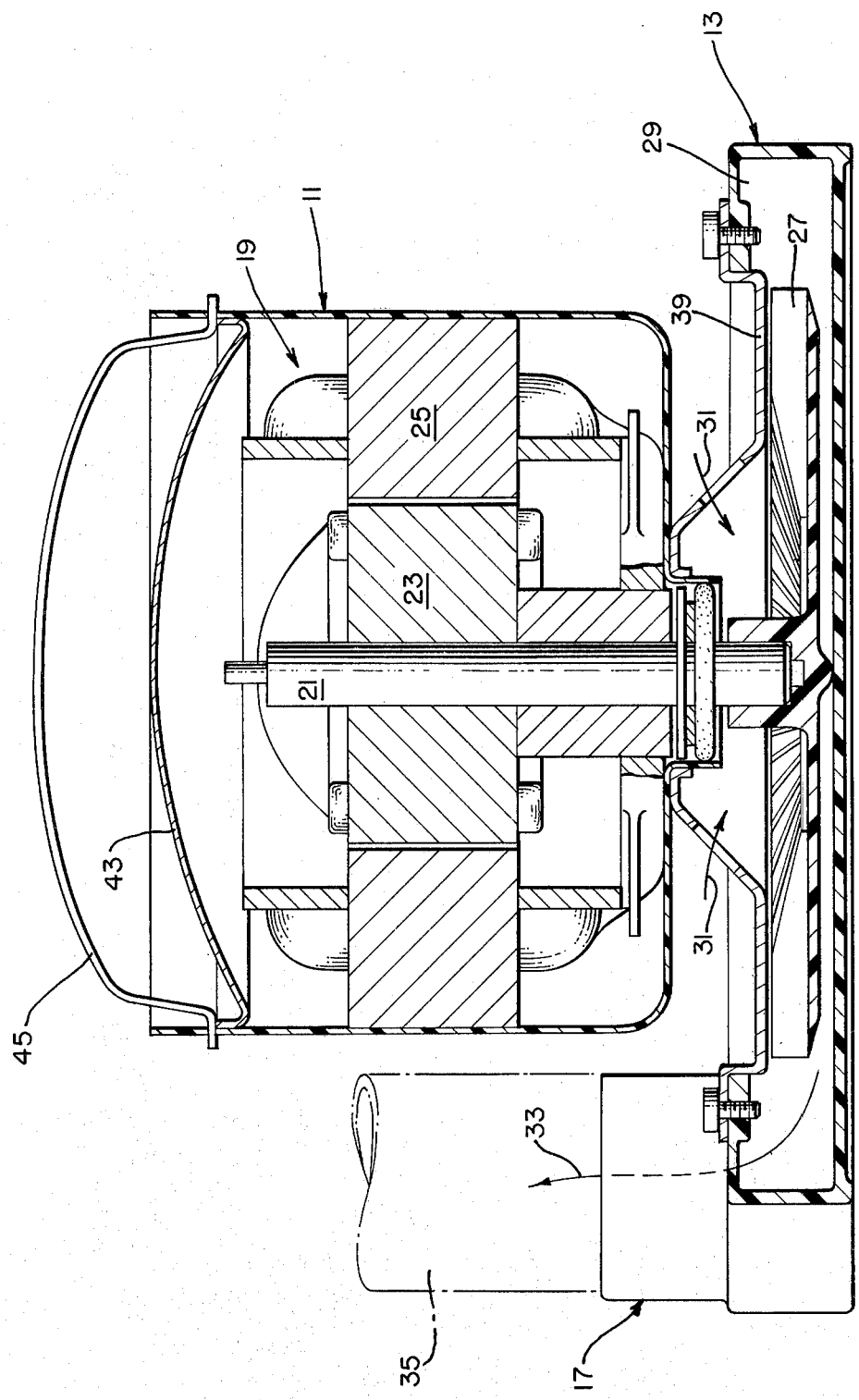
FIG. 7 is an enlarged cross-sectional side view of the sump pump of the preferred embodiment of the present invention.

The operation of the sump pump of FIGS. 7 through 9 will now be briefly described. The pump will normally be off and will remain off until the water in the sump pit rises to a predetermined pump-activating level 61. When the water has risen to that point, the light from the LED 71 will be refracted and defused at the interface 58 between the optical sensor 40 and the liquid in the sump pit. With no internally reflected light reaching the phototransistor 73, the phototransistor will switch off and the circuit will activate the motor to start pumping the liquid from the sump pit.

This operation will continue until the level of liquid in the pit has fallen below the pump-activating level 61. The presence of air at the interface 58 will cause the light to be internally reflected back to the phototransistor 73 switching it to a conductive state. At the end of the predetermined time delay, the control circuit will break the ground path and deactivate the pump motor. The motor will then remain off until the level of liquid in the sump once again rises to the pump-activating level 61.

It will be appreciated that the expiration of the predetermined time delay represents the removal of the predetermined volume of water from the sump. Under conditions where the flow of additional water into the sump is non-existent or at a very low rate, each operation cycle of the pump will normally lower the water level in the sump to substantially the same level below the pump turns off. In that sense, the embodiment of FIGS. 1-6, will normally shut the pump off when the water level drops to a predetermined level, though measured by time lapse. If the rate of water inflow to the sump is more substantial, the level at pump shut-off may be slightly higher than such predetermined level, dependent upon the actual rate of inflow.

With this detailed description used to illustrate the preferred and alternate embodiments of the present invention and the operation thereof, it will be obvious to those skilled in the art that various modifications can be made in the circuitry and means for implementing the method and apparatus of the present invention without departing from the spirit and scope of my invention which is limited only by the appended claims.

I claim:

1. In a submersible sump pump having a motor which drives pumping means mounted in a pumping chamber forming part of the pump housing, the pumping chamber having inlet means through which liquid in the sump surrounding the pump may enter the low pressure zone of the pumping chamber and outlet means through which pumped liquid may leave the high pressure zone of the pumping chamber and pump housing, motor control means for causing the pump to commence operation whenever the liquid level surrounding the pump rises to a predetermined pump-activating level and for causing the pump to thereafter continue operation until the liquid level has fallen to a predetermined pump-deactivating level below said pump-activating level, the improved means for detecting the surrounding liquid level which comprises:

pumping chamber inlet means including a sensing chamber comprising first and second portions, said first sensing chamber portion having a sensing chamber inlet located at the pump-deactivating level and communicating with the surrounding sump, said first sensing chamber portion rising from said inlet to an overflow point located at the pump-activating level, said second sensing chamber portion communicating with the upper portion of said first sensing chamber portion above said overflow point whereby liquid rising in said first sensing chamber portion overflows into said second sensing chamber portion only after it rises above said overflow point, said second sensing chamber portion having an outlet into the low pressure zone of the pumping chamber;

the pump, once activated, being capable of causing liquid to continue to flow through said first and second portions of said sensing chamber to the low pressure zone of the pumping chamber as a result of a siphon action which pulls liquid over said overflow point until the siphon is broken when the level of the surrounding liquid falls below said sensing chamber inlet;

a liquid level sensing device located in said sensing chamber and capable of sensing the presence or absence of liquid at a predetermined point within said sensing chamber, which predetermined point contains liquid only when a rising liquid level has overflowed said overflow point and thereafter until said siphon action is broken;

said sensing device being operatively connected to the motor control means to activate the motor and pump only when said sensing device senses that liquid is present at said predetermined point.

2. The pump of claim 1 wherein said sensing device comprises a light source, a photo-electric device and an optical sensor having a control surface which is the interface between said optical sensor and said predetermined point in said sensing chamber, said control surface having variable light reflecting and refracting properties by which light from said light source is either reflected therefrom to said photo-electric device or is refracted therethrough and away from said photo-electric device depending upon the presence or absence of liquid at said predetermined point, said photo-electric device thereby providing a liquid level-responsive signal to the motor control means.

3. In a submersible sump pump having a housing enclosing an electric motor and an impeller rotatably driven thereby within a volute defined by a portion of the housing, the housing including a liquid inlet path to the volute and a liquid outlet path from the volute, motor control means for activating the pump when the surrounding liquid level rises to a first predetermined level and for deactivating the pump when the surrounding liquid level falls to a second predetermined level located below the first level, the improved means for detecting the attainment of the first and second liquid levels comprising:

a liquid sensing device secured to the housing at an elevation which is above the volute and which substantially corresponds to the first predetermined level, said sensing device being operative whenever a portion of it is substantially submerged in liquid to cause the motor control means to activate the pump, and being further operative whenever said portion is no longer submerged to cause the motor control means to deactivate the pump;

the liquid inlet path to the volute including inlet port means located at the second predetermined level and an exit discharging into the volute, the path between said inlet and exit being completely enclosed within the housing and causing all liquid flowing therealong to rise from said inlet port means to a level at least as high as the first predetermined level before descending to the volute via said inlet path exit;

said portion of said liquid sensing device being so located within the liquid inlet path to be submerged only (1) when the surrounding liquid level is at least as high as said first predetermined level or (2) when liquid is flowing along said inlet path from said inlet port means to the volute.

4. The pump of claim 3 wherein said inlet path includes air relief valve means communicating with the upper portion thereof and operative to permit air to escape from said upper portions as the liquid level rises therein.

5. The pump of claim 3 wherein the impeller is below the motor and wherein the upper edge of said inlet port means is at an elevation at least as high as the lowermost portion of the pump motor windings.

6. The pump of claim 3 wherein said sensing device comprises a light source, a photo-electric device and an optical sensor, the submergible portion of said sensing device being a control surface which is the interface between said optical sensor and said liquid inlet path, said control surface having variable light reflecting and refracting properties by which light from said light source is either reflected therefrom to said photo-electric device or is refracted therethrough and away from said photo-electric device depending upon the presence or absence of submerging liquid at said control surface, said photoelectric device thereby providing a liquid level-responsive signal to the motor control means.

7. In a submersible sump pump having a housing enclosing an electric motor and an impeller rotatably driven thereby within a volute defined by a portion of the housing, the housing including a liquid inlet path to the volute and a liquid outlet path from the volute, motor control means for activating the pump when the surrounding liquid level rises to a first predetermined level and for deactivating the pump when the surrounding liquid level falls to a second predetermined level located below the first level, the improved means for detecting the attainment of the first and second liquid levels comprising:

the liquid inlet path comprising inlet port means to the housing located at the second predetermined level and an exit discharging into the volute, the path between said inlet port means and said exit being completely enclosed and causing all liquid entering the housing therethrough to rise from said inlet port means through an ascending chamber having no outlet until the fluid level reaches the first predetermined level, at which level the fluid flows over a barrier into a descending chamber leading to said inlet path exit to the volute;

a liquid sensing device secured to the interior of the housing at an elevation above said second predetermined level and having a sensing portion thereof positioned in said inlet path so as to be selectively submerged in the liquid within said inlet path only (1) when a rising condition of the surrounding liquid level in the sump has caused said level to rise in said inlet path to said first predetermined level and (2) thereafter until the falling condition of the surrounding liquid level in the sump has caused said level to fall below said second predetermined level;

said liquid sensing device being operative to cause the motor control means to activate the pump only when said sensing portion is submerged.

8. The pump of claim 7 wherein said sensing device comprises a light source, a photo-electric device and an optical sensor, the sensing portion of said sensor comprising a control surface which is the interface between said optical sensor and said inlet path, said control surface having variable light reflecting and refracting properties by which light from said light source is either reflected therefrom to said photo-electric device or is refracted therethrough and away from said photo-electric device depending upon whether said control surface is submerged, said photo-electric device thereby providing a liquid level-responsive signal to the motor control means.

9. In a submersible sump pump having a housing enclosing an electric motor and an impeller rotatably driven thereby within a volute defined by a portion of the housing, the housing including an inlet path to the volute and a liquid outlet path from the volute, motor control means for activating the impeller when the surrounding liquid level rises to a first predetermined level and for deactivating the impeller when the surrounding liquid level falls to a second predetermined level located below the first level, the improvement comprising:

a liquid inlet path to said volute including inlet port means located at said second predetermined level and an exit discharging into the volute, the path between said inlet and exit being completely enclosed within the housing and causing all liquid flowing therealong to rise from said inlet port means to a level at least as high as the first predetermined level before descending to the volute via said inlet path exit;

a single optical sensing means for detecting when the liquid within the sump pump has risen to said first predetermined level and also for detecting when the liquid has fallen to said second predetermined level, said optical sensing means including light-emitting means, light-detecting means, and optical means having at least one surface interfacing with the air or liquid in said sump, said optical means reflecting the light from said light-emitting means back to said light-detecting means whenever air is present at said interface and refracting light into the liquid so that relatively little light reaches said light-detecting means whenever liquid is present at said interface;

said optical sensing means being secured to the housing at an elevation which is above the volute and which substantially corresponds to said first predetermined level, said optical sensing means being operative whenever a portion of it is substantially submerged in liquid to cause said motor control means to operate the impeller and being further operative whenever said portion is no longer submerged to cause the motor control means to deactivate said impeller;

said portion of said optical sensing means being so located within the liquid inlet path to be submerged only (1) when the surrounding liquid level is at least as high as said first predetermined level or (2) when liquid is flowing along said inlet path from said inlet port means to the volute via a siphoning action such that even after the liquid in said sump has fallen below said first predetermined level by the pumping operation, liquid continues to flow along said inlet path via a siphon effect until the level of liquid in said pump has been reduced to said second predetermined level at which time the siphon is broken and the optical sensing means senses air at the interface surface such that said light-detecting means causes said motor control means to deactivate said impeller.

* * * * *